(12) United States Patent
Romeo et al.

(10) Patent No.: US 11,934,650 B1
(45) Date of Patent: Mar. 19, 2024

(54) SYNCHRONIZED SCROLLING OF MULTIPLE GRIDS ACROSS MULTI-DIMENSIONAL DATA

(71) Applicant: Anaplan, Inc., San Francisco, CA (US)

(72) Inventors: Leigh James Romeo, New Barnet (GB); Steven George Prendergast, York (GB); James Anthony Gargett, York (GB); Gregory Pratt, Leeds (GB)

(73) Assignee: Anaplan, Inc., San Francisco, CA (US)

( * ) Notice: Subject to any disclaimer, the term of this patent is extended or adjusted under 35 U.S.C. 154(b) by 0 days.

(21) Appl. No.: 18/156,336

(22) Filed: Jan. 18, 2023

(51) Int. Cl.
*G06F 3/0485* (2022.01)
*G06F 40/177* (2020.01)

(52) U.S. Cl.
CPC .......... *G06F 3/0485* (2013.01); *G06F 40/177* (2020.01)

(58) Field of Classification Search
CPC .. G06F 40/177; G06F 3/0485; G06F 3/04855; G06F 40/18
See application file for complete search history.

(56) References Cited

U.S. PATENT DOCUMENTS

| | | | | |
|---|---|---|---|---|
| 5,943,051 A * | 8/1999 | Onda | ............... | G06Q 10/06314 715/963 |
| 6,421,071 B1 * | 7/2002 | Harrison | .......... | G01R 31/31935 715/802 |
| 6,912,694 B1 * | 6/2005 | Harrison | ............... | G06F 3/0485 715/784 |
| 6,958,981 B1 * | 10/2005 | Hemminger | ............ | H04L 67/02 709/205 |
| 2007/0168855 A1 * | 7/2007 | Patel | ....................... | G06F 3/048 715/205 |
| 2008/0040683 A1 * | 2/2008 | Walsh | ................. | G06F 3/04855 715/781 |
| 2009/0150822 A1 * | 6/2009 | Miller | ................... | G06F 3/0485 715/784 |
| 2012/0151317 A1 * | 6/2012 | Ho | .......................... | G06F 40/18 715/217 |
| 2014/0351746 A1 * | 11/2014 | Evans | ................... | G06F 40/177 715/784 |
| 2018/0364899 A1 * | 12/2018 | Dogan | ................... | G06Q 10/00 |

* cited by examiner

*Primary Examiner* — Asher D Kells
(74) *Attorney, Agent, or Firm* — Chamberlain, Hrdlicka, White, Williams & Aughtry; Aly Z. Dossa (57) ABSTRACT

A method for managing display of data on a computing device includes obtaining a grid state for a grid, identifying a sync scroll group associated with the grid, updating a sync scroll groups data structure based on the identifying, making a first determination that a second grid is associated with the sync scroll group, and based on the first determination, updating a second grid state for the second grid based on the first grid state, wherein updating the second grid state for the second grid triggers an update to a display of the second grid in a browser display on the computing device.

18 Claims, 11 Drawing Sheets

SYNCHRONIZED SCROLLING OF MULTIPLE GRIDS ACROSS MULTI-DIMENSIONAL DATA

BACKGROUND

Companies collect large amounts of data about their own operations. This data is then analyzed to determine, among other things, how to improve the operation of the company and/or how to plan for the future operation of the company. Large amounts of data may be analyzed in multiple dimensions. Computing devices operated by users may provide a user interface that displays multiple grids, each showing at least one dimension of the data. Because of the size of the data, the user interface may be utilized to scroll the multiple grids when displaying a portion of the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a browser in accordance with one or more embodiments of the invention.

FIG. 3.1 shows a flowchart of a method of creating a sync scroll group in accordance with one or more embodiments of the invention.

FIG. 3.2 shows a flowchart of a method of monitoring the grid state of a grid in accordance with one or more embodiments of the invention.

FIG. 3.3 shows a flowchart of a method of updating a sync scroll groups data structure based on grid state in accordance with one or more embodiments of the invention.

FIG. 3.4 shows a flowchart of a method of updating grid state in accordance with one or more embodiments of the invention.

FIG. 3.5 shows a flowchart of a method of providing an updated grid state in accordance with one or more embodiments of the invention.

FIGS. 4.1-4.3 show an example in accordance with one or more embodiments of the invention.

SUMMARY

In general, in one aspect, the invention relates to a method for managing a display of data on a computing device. The method includes obtaining a first grid state for a first grid, identifying a sync scroll group associated with the first grid, updating a sync scroll groups data structure based on the identifying, making a first determination that a second grid is associated with the sync scroll group, and based on the first determination, updating a second grid state for the second grid based on the first grid state, wherein updating the second grid state for the second grid triggers an update to a display of the second grid in a browser display on the computing device.

In one aspect, the invention relates to a system that includes a processor executing a browser, wherein the browser comprises: a first grid state manager, a second grid state manager, and a global sync group manager. The global sync group manager is programmed to: obtain, from the first grid state manager, a first grid state for a first grid of a sync scroll group, and update a sync scroll groups data structure based on the first grid state. The second grid state manager is programmed to: send a request for a current grid state of a second grid to the global sync group manager, wherein the second grid is associated with the sync scroll group, obtain, from the global sync group manager, a response, and based on the response, updating a second grid state of the second grid with the current grid state, and wherein updating the second grid state for the second grid triggers an update to a browser display of the browser, wherein the browser display comprises at least a portion of the second grid.

In one aspect, the invention relates to a non-transitory computer readable medium that includes computer readable program code, which when executed by a computer processor enables the computer processor to perform a method for managing data. The method includes obtaining a first grid state for a first grid displayed on a browser, wherein the first grid state changed from a previous grid state based on scrolling of the first grid in a first scrolling direction, identifying, in response to the first grid state change, a sync scroll group associated with the first grid, wherein the sync scroll group specifies the first grid, a second grid, a sync scroll direction, and a current grid state, updating the current grid state based on the first grid state, and updating a second grid state for the second grid based on the current grid state, wherein updating the second grid state for the second grid triggers an update to a display in a browser display on a computing device.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments disclosed herein relate to systems and methods for managing data displayed to a user. Embodiments disclosed herein provide synchronized scrolling of multiple grids of a synchronized scroll group (also referred herein as a "sync scroll group").

As described herein, a sync scroll group relates to a group of grids that are intended to be synchronized in coordinates in at least one scrolling direction (e.g., horizontally, vertically, etc.). By synchronizing coordinates, as one grid in a sync scroll group is scrolled by a user in the scrolling direction, the other grids in the sync scroll group are to be automatically scrolled in synchronization with the first grid.

The multiple grids may be displayed via a browser executing on a client device. The browser may further include a browser backend that includes a global sync group manager. The global sync group manager may manage a sync scroll groups data structure that specifies the sync scroll groups. Each sync scroll group may correspond to a group of grids that are to be synchronized in a scrolling direction (e.g., horizontal or vertical scrolling). Said another way, as a user scrolls a grid in a scrolling direction, other grids in the same sync scroll group may be automatically scrolled in the same scrolling direction if the scrolling direction is specified for the sync scroll group. For example, consider a scenario in which a sync scroll group specifies a vertical synchronized scrolling for a first and second grid. If a user utilized a graphical user interface to scroll the first grid vertically, embodiments disclosed herein enable the second grid to be automatically scrolled in a synchronized manner with the scrolling of the first grid.

Figure 11:
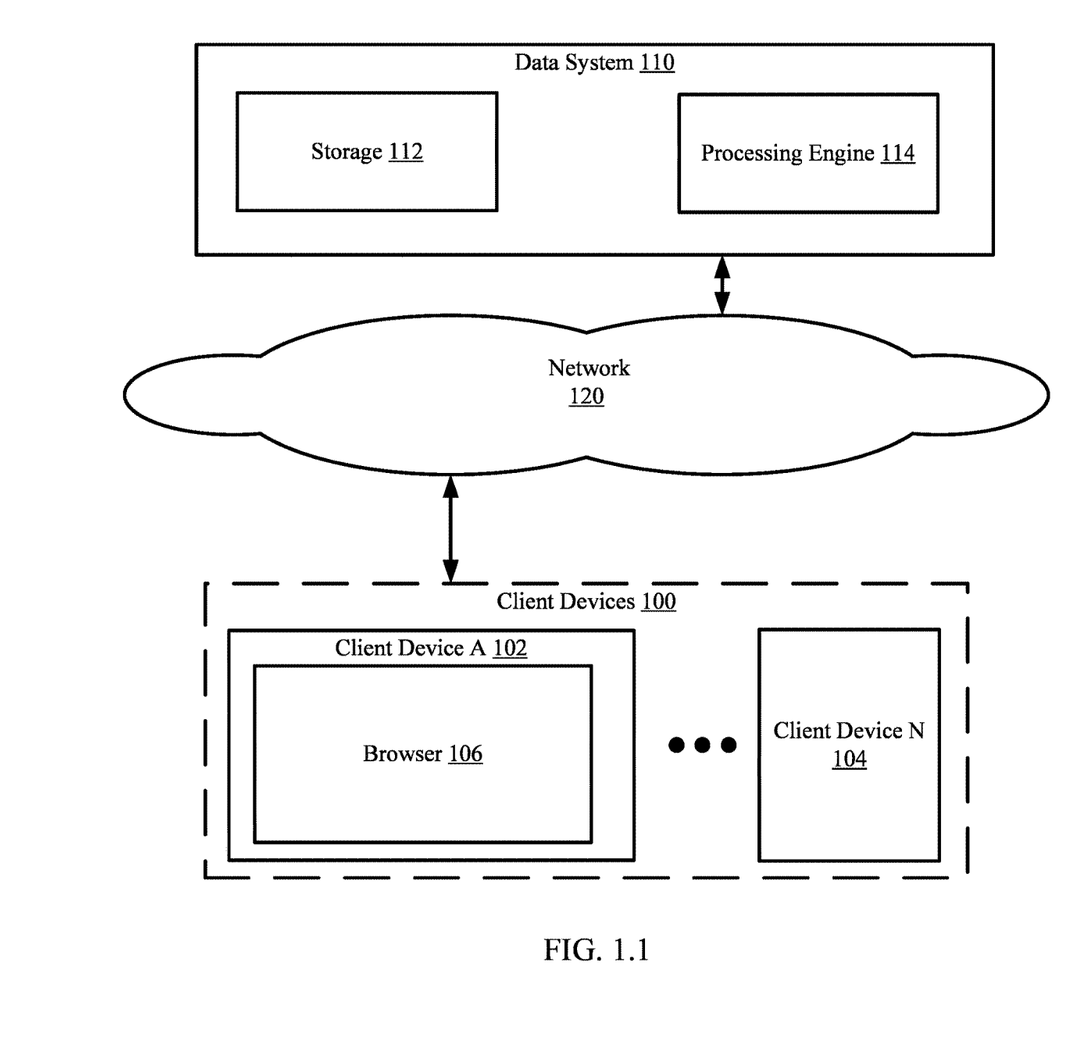

FIG. 1.1 shows a diagram of a system in accordance with one or more embodiments of the invention. The system includes a data system (110) interacting with one or more client devices (100) via a network (120). The components illustrated in FIG. 1.1 may be connected via any number of operable connections supported by any combination of wired and/or wireless networks (e.g., 120). Each component of the system of FIG. 1.1 (including the individual components in the data system) may be operably connected via any combination of wired and/or wireless connections. Each component of the system of FIG. 1.1 is discussed below.

In one or more embodiments of the invention, the data system (110) includes storage (112) and a processing engine (114). The storage (112) may include functionality for storing data. The data may be large amounts of data. At least a portion of the data in the storage (112) may be provided to the clients (100).

In one embodiment of the invention, the storage (112) includes any form of non-volatile storage media that may store data (e.g., user data and derived data). Examples of persistent storage may include, but are not limited to, magnetic storage, optical storage, solid state memory, or any combination thereof In one embodiment of the invention, the data stored in persistent storage may be user data and derived data. Depending on the implementation of the invention, the persistent storage may store the user data and not store the derived data.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof In one or more embodiments, the processing engine (114) includes functionality for receiving requests from the client devices (100) to manage the user data in the storage (112). The requests may be used to obtain user data or derived data from the storage (112). Alternatively, the requests may be used to store new user data in the storage (112) from the client devices (100).

In one embodiment of the invention, the processing engine (114) may be implemented on a computing device or as a logical device (e.g., a virtual machine, a container, etc.).

In one or more embodiments of the invention, the processing engine (114) is implemented as a computing device. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functionality of the processing engine (114) as described throughout this application.

In one or more embodiments of the invention, the processing engine (114) is implemented as a logical device. Each of the logical devices may utilize the computing resources of any number of computing devices and thereby provide the functionality as described throughout this application. Examples of logical devices may include, but are not limited to, virtual machines and containers.

In one or more embodiments, the client devices (100) issue requests for storing data and obtaining data from the data system (110). The requests may be processed by the processing system (114) of the data system (110). The data obtained from the data system (110) may be stored in persistent or non-persistent storage (not shown) of the client devices (102, 104).

Figure 12:
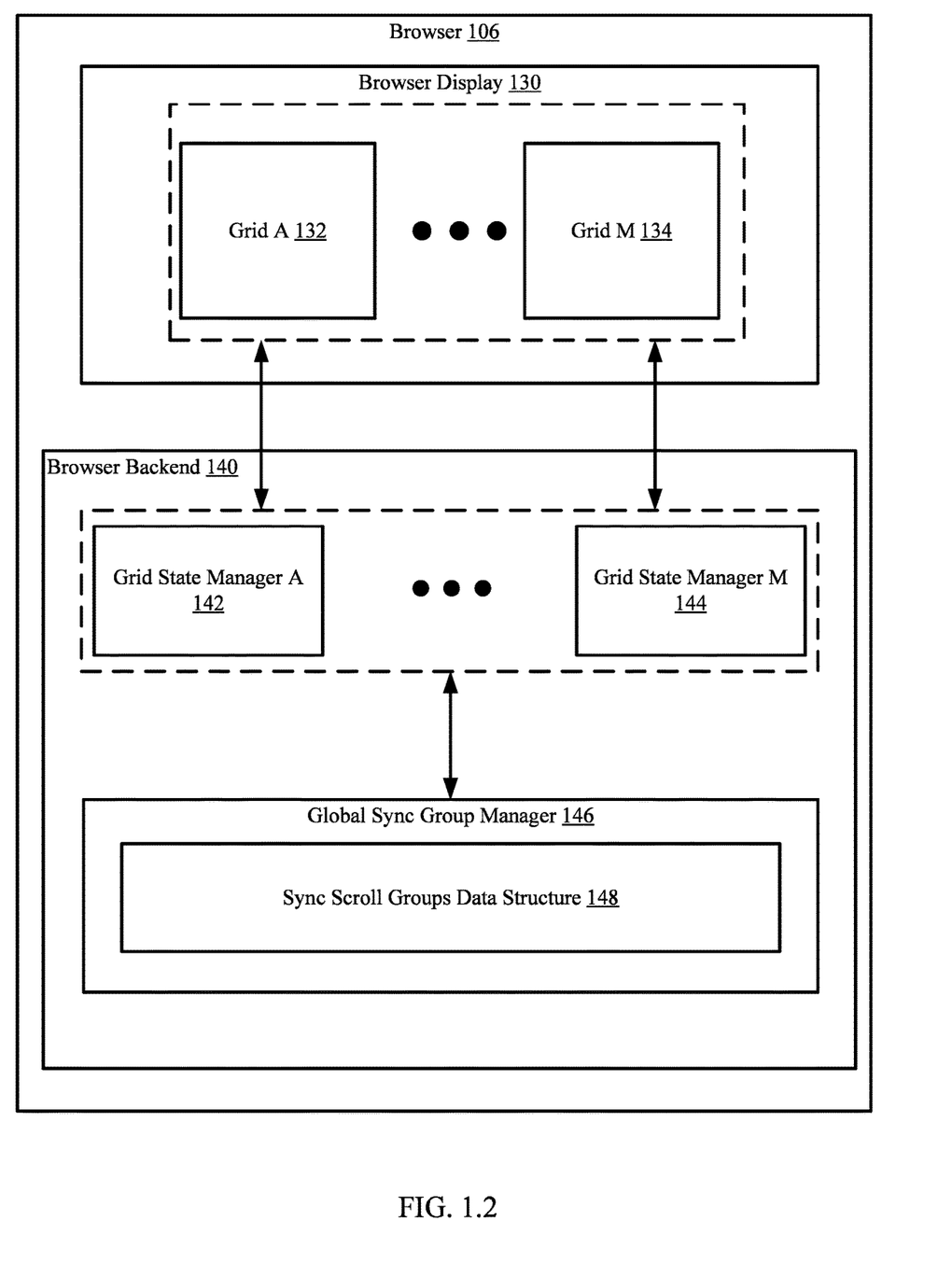

Further, the data may be processed by users (not shown) of the client devices (102, 104) via browsers (106) operating in each client device (102, 104). For example, the browser (106) of a client device (102) may provide a user interface that enables the user to interact with the data in the client devices (102). The data may be displayed as grids. Each grid may organize the data in one or more dimensions (e.g., variables) such that the user may view, add, or otherwise modify the data. For additional details regarding the browser (106), see, e.g., FIG. 1.2.

In one or more embodiments of the invention, zero, one or more client devices (102, 104) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application.

In one or more embodiments of the invention, the zero, one, or more client devices (102, 104) are implemented as logical devices. Each of the logical devices may utilize the computing resources of any number of computing devices, and thereby provide the functionality to issue one or more query requests and to receive one more query responses as described throughout this application. Examples of logical devices may include, but are not limited to, virtual machines and containers.

FIG. 1.2 shows a diagram of a browser in accordance with one or more embodiments of the invention. In one embodiment of the invention, the browser (106) includes a browser display (130) and a browser backend (140). The browser display (130) includes two or more grids (132, 134). The browser backend (140) includes grid state managers (142, 144) and a global sync group manager (146). Each of these components is described below.

In one or more embodiments, the browser display (130) provides a user interface for the user to interact with data stored in the client device. The user interface may be, for example, a graphical user interface (GUI). The GUI may display one or more grids (132, 134). Each grid (132, 134) may be a matrix of two or more dimensions (e.g., rows and columns) of cells that display data. Each grid (132, 134) may display the data using other visual representations of the data or using other dimension without departing from the invention. For example, each grid (132, 134) may display a graph, an image, etc. Further, other dimensions may be used such as, for example, cell color, cell size, font size of cells, and font color.

In one or more embodiments of the invention, the data displayed by a grid (132, 134) in the browser display (130) at any given point in time may be a portion of the total data associated with a grid. For example, the grid may be a matrix with 100 rows and 100 columns. The grid displayed by the browser (106) may only include a window of 5 rows and 5 columns. To enable user interactions with the grids (132, 134), each grid may include GUI controls. An example of a GUI control includes scrolling. The GUI of the browser display (130) may enable the user to scroll any one or more of the grids (132, 134) in one or more scrolling directions to display other windows of the data in the grid. In one or more embodiments, the user may scroll in a vertical direction or in a horizontal direction.

In one or more embodiments, the grid controls impact the grid state of the grid. In one or more embodiments of the invention, the grid state of a grid (132, 134) is a collection of metadata associated with the grid. Example of the metadata associated with the grid state includes, for example, a current set of rows or columns displayed. The set of current set of rows or columns displayed by a grid (132, 134) may further be referred to as a set of coordinates for the grid (132, 134).

In one or more embodiments of the invention, the browser display (130) may provide the grids (132, 134) in a grid display. An example grid display may be provided, e.g., in FIG. 2.

Figure 32:
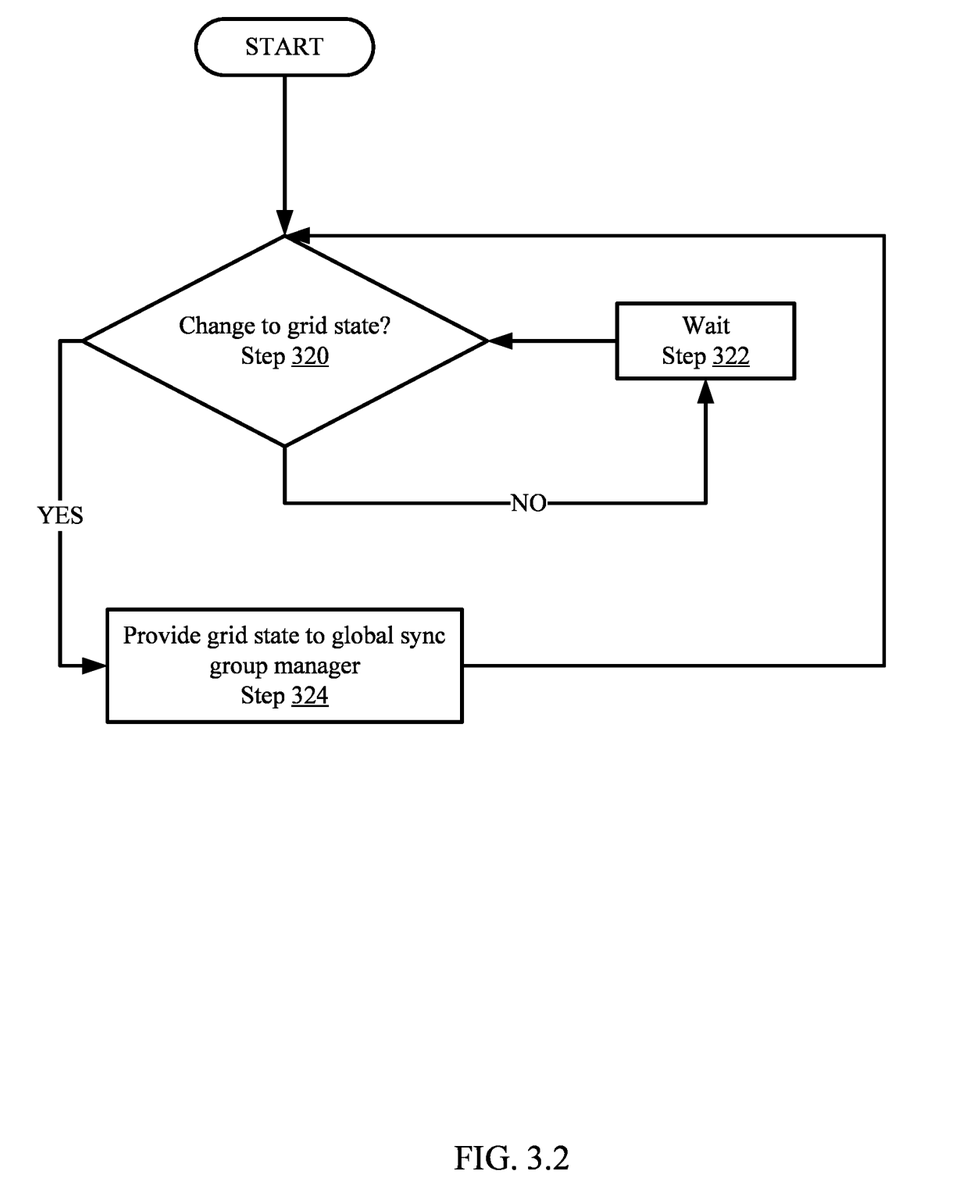
Figure 34:
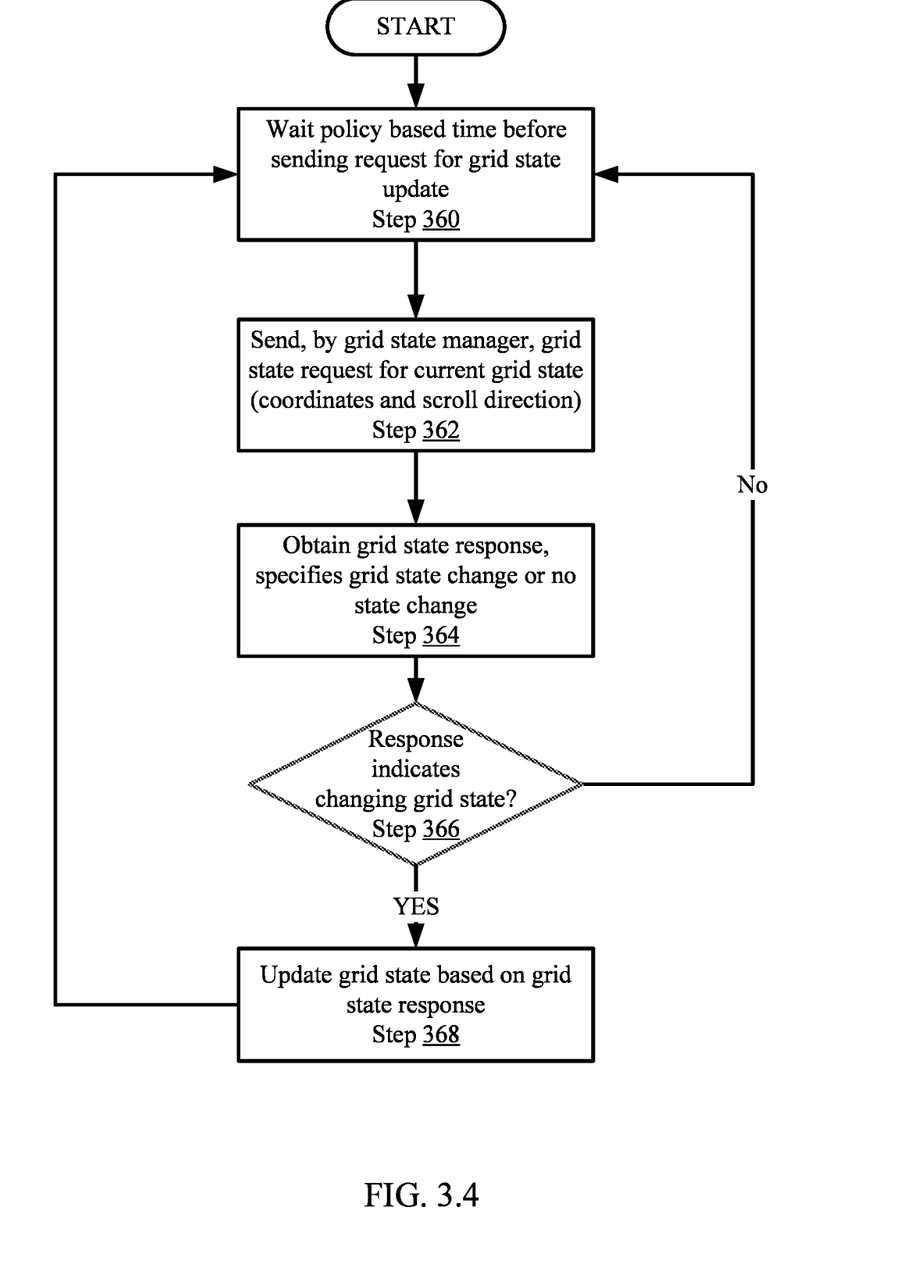

In one or more embodiments of the invention, the grid state of each grid (132, 134) is managed by a grid state manager (142, 144). In one or more embodiments, a grid state manager (142, 144) may manage the grid state by monitoring the grid state of a respective grid (132, 134) and provide that grid state to the global sync group manager (146). Further, the grid state may be managed by updating the grid state based on information obtained from the global sync group manager (146). For example, based on the change in the current state of the sync scroll group (discussed below) of the respective grid (132, 134), it may be required to change the set of coordinates displayed by the grid (132, 134). In this scenario, the grid state manager (142, 144) may include functionality to change the set of coordinates displayed by the grid (132, 134). The grid state manager (132, 134) may manage the grid state of the respective grid (132, 134) in accordance with the methods described in FIGS. 3.2 and 3.4.

In one or more embodiments of the invention, the grid state managers (142, 144) are implemented in hardware (i.e., circuitry), software, or any combination thereof In one or more embodiments, the grid state managers (142, 144) may be configured to cause a computing system to perform the functionality of the grid state managers (142, 144) described throughout this application.

Figure 31:
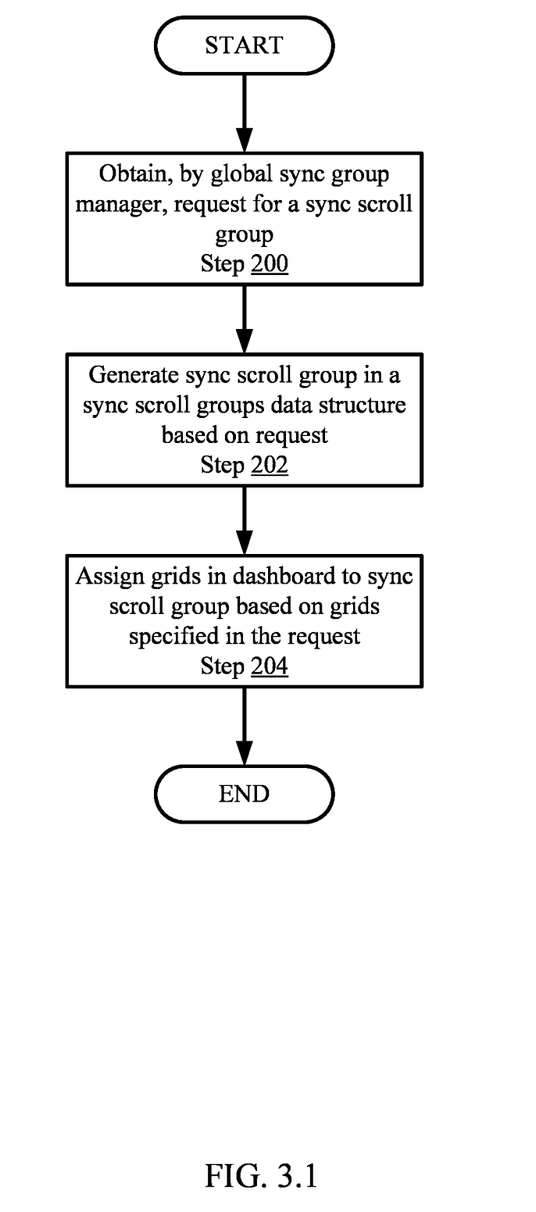

In one or more embodiments, the global sync group manager (146) includes functionality for tracking the sync scroll groups of the grids (132, 134) and the current state of the sync scroll groups. To perform the aforementioned functionality, the global sync group manager (146) includes a sync scroll groups data structure (148) that specifies the current sync scroll groups and the corresponding grid states. The sync scroll groups may be generated, e.g., in accordance with FIG. 3.1.

Figure 35:
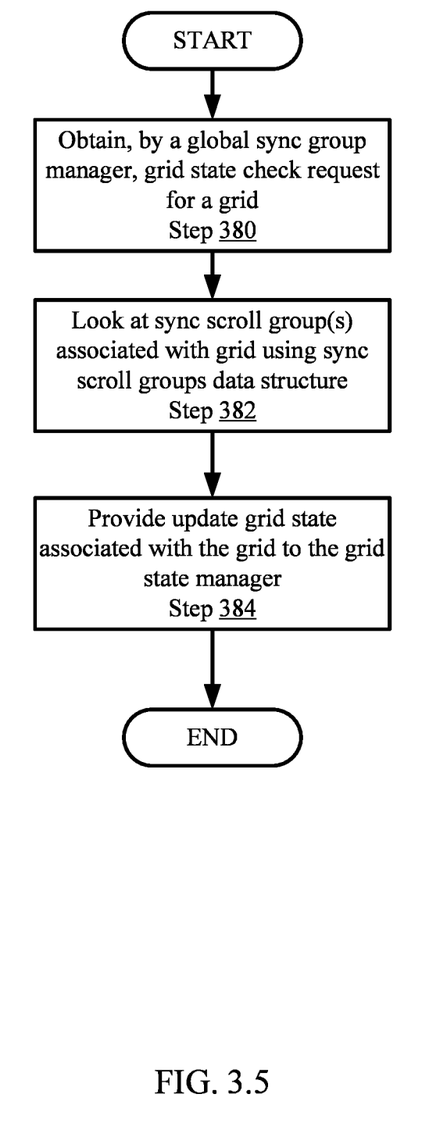

In one or more embodiments of the invention, the global sync group manager (146) further includes functionality for providing current state of a sync scroll group to a grid state manager (142, 144). The global sync group manager (146) may provide the current state in accordance with the method of FIG. 3.5.

In one or more embodiments of the invention, the global sync group manager (146) is implemented in hardware (i.e., circuitry), software, or any combination thereof In one or more embodiments, the global sync group manager (146) may be configured to cause a computing system to perform the functionality of the global sync group manager (146) described throughout this application.

Figure 2:
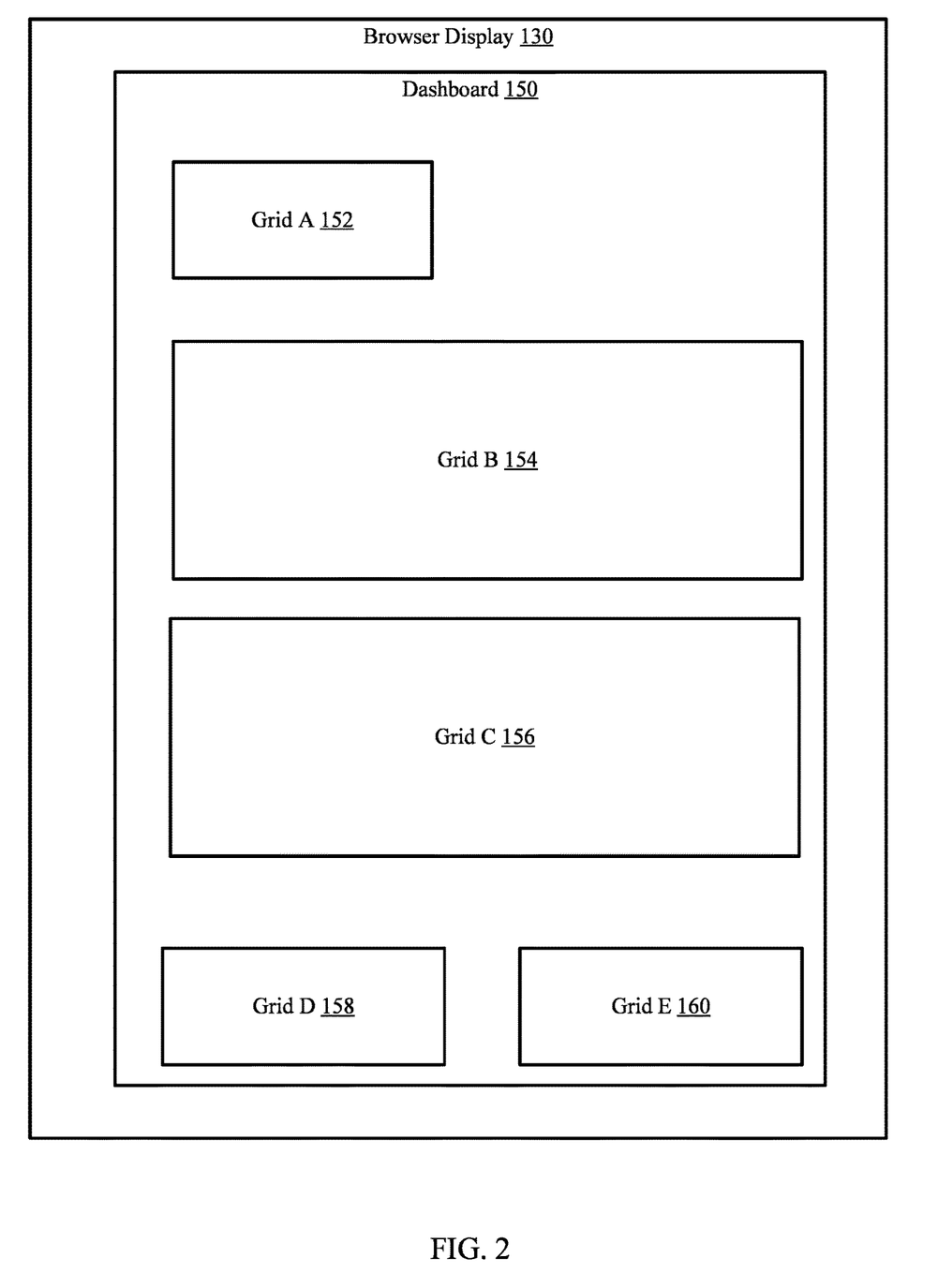
FIG. 2 shows a diagram of an example browser display in the system in accordance with one or more embodiments of the invention.

FIG. 2 shows a diagram of an example browser display in accordance with one or more embodiments of the invention. The browser display (130) illustrated in FIG. 2 includes a dashboard (150) that displays five grids: grid A (152), grid B (154), grid C (156), grid D (158), and grid E (160).

The dashboard (150) may display the grids (152, 154, 156, 158, 160) in a configuration determined by a user controlling the dashboard (150) using a GUI. For example, grid A (152) may be displayed in the top left corner of the dashboard (150). Further, grids B and C (154, 156) may be aligned vertically. Grids D and E (158, 160) may be aligned horizontally.

Consider a scenario in which grids B and C (154, 156) are in a first sync scroll group that synchronizes during horizontal scrolling. Said another way, if the user scrolls one of the two grids (154, 156) to the right or to the left, the other grid in the sync first scroll group is designed to scroll automatically to synchronize with the scrolling done by the user. The placement of grids A (154) and B (156) in vertical alignment maintains the alignment of the cells in the two grids (154, 156) during horizontal scrolling.

Similarly, consider a scenario in which grids D and E (158, 160) are in a second sync scroll group that synchronizes during vertically scrolling. Said another way, if the user scrolls one of the two grids (156, 160) up or down, the other grid in the sync second scroll group is designed to scroll automatically to synchronize with the scrolling done by the user. The placement of grids D (158) and E (160) in horizontal alignment maintains the alignment of the cells in the two grids (154, 156) during vertical scrolling.

In one or more embodiments of the invention, the configuration of at least one of the two sync scroll groups is performed by the user. For example, via the GUI, the user may be provided a menu of options for configuring the sync group. The user may utilize the menu of options to select the grids to be assigned to the sync scroll group, and select one or more of the scrolling directions to be synchronized for the sync scroll group. The configuration may be initiated by sending a request to the global sync group manager (146, FIG. 1.2) discussed above. The request may be serviced by the global sync group manager in accordance with the method of FIG. 3.1.

In one or more embodiments of the invention, the configuration of at least one of the two sync scroll groups is performed by a second user via a second browser in a second computing device. The second browser may provide a second GUI used by the second user to initiate the configuration. The resulting configuration may be obtained by the browser (130), e.g., via a network. The browser (130) may implement the configuration to provide the synchronized scrolling as discussed throughout the discussion of FIG. 2. The configuration may be initiated by sending a request to the global sync group manager (146, FIG. 1.2) discussed above. The request may be serviced by the global sync group manager in accordance with the method of FIG. 3.1.

While the system of FIGS. 1.1-2 has been illustrated as including a limited number of components for the sake of brevity, the system may include additional components (not shown), fewer components, and/or different components (not shown) without departing from the invention.

FIGS. 3.1-3.5 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3.1-3.5 may be performed in parallel with any other steps shown in FIGS. 3.1-3.5 without departing from the scope of the invention.

FIG. 3.1 shows a flowchart of a method of creating a sync scroll group in accordance with one or more embodiments of the invention. All or a portion of the method shown in FIG. 3.1 may be performed by, for example, the global sync group manager (146, FIG. 1.2). Other components of the system of FIGS. 1.1-2 may perform the method of FIG. 3.1 without departing from the invention.

Turning to FIG. 3.1, in step 300, a request for a sync scroll group is obtained. In one or more embodiments, the sync scroll group request includes specifying the grids to be included in the sync scroll group. The sync scroll group request may further include the scrolling direction to be synchronized. The sync scroll group request may further include an initial set of coordinates to be applied to the grids in the sync scroll group.

In step 302, a sync scroll group is generated using a sync scroll groups data structure. In one or more embodiments, the sync scroll group is generated by generating an entry in the sync scroll groups data structure that specifies an identifier of the sync scroll group. The aforementioned entry may further specify the grids specified in the sync scroll request and the sync scroll direction.

In step 304, grids in a dashboard are assigned to the sync scroll groups based on the request. In one or more embodiments, the grids are assigned by notifying the grid state managers of the corresponding grids of the sync scroll group and notifying the grid state managers of an updated grid state to be applied to the corresponding grids. The update grid state may specify the initial set of coordinates (if included) specified in the sync scroll group request.

FIG. 3.2 shows a flowchart of a method of monitoring the grid state of a grid in accordance with one or more embodiments of the invention. All or a portion of the method shown in FIG. 3.2 may be performed by, for example, a grid state manager (142, 144, FIG. 1.2). Other components of the system of FIGS. 1.1-2 may perform the method of FIG. 3.2 without departing from the invention.

In step 320, a determination is made about whether a change to the grid state is made. The determination may be made based on a monitoring of the grid state manager performed on the corresponding grid. For example, if a user utilizes a GUI to change the grid state (e.g., by scrolling) of the grid, this may trigger a grid state change. If a change to the grid state is made, the method proceeds to step 324; otherwise, the method proceeds to step 322.

In step 322, the grid state manager waits. In one or more embodiments, the grid manager waits for a predetermined interval of time before proceeding to step 320.

In step 324, the grid state is provided to the global sync group manager. In one or more embodiments, the grid state may include the current set of coordinates displayed for the grid. Further, the grid state may further include the change in the grid state (e.g., whether the grid was scrolled in a vertical or horizontal direction).

Figure 33:
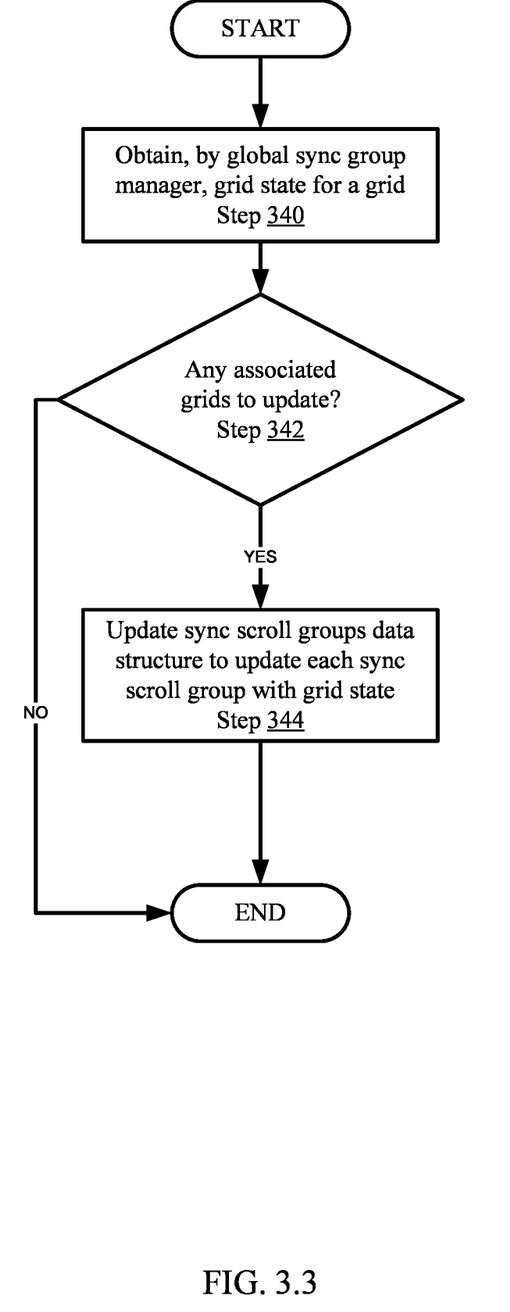

FIG. 3.3 shows a flowchart of a method of updating a sync scroll groups data structure based on grid state in accordance with one or more embodiments of the invention. All or a portion of the method shown in FIG. 3.3 may be performed by, for example, the global sync group manager (146, FIG. 1.2). Other components of the system of FIGS. 1.2-2 may perform the method of FIG. 3.3 without departing from the invention.

In step 340, grid state is obtained for a grid. In one or more embodiments, the grid state obtained in step 340 is the grid state provided by the grid state manager in step 324 of FIG. 3.2. The grid state may be associated with a grid.

In step 342, a determination is made about whether there are any associated sync scroll groups to update. In one or more embodiments, the determination of step 342 is based on whether the grid is associated with one or more sync scroll groups. In one or more embodiments, the determination is further based on whether the change in the grid state is changed in the scrolling direction of the corresponding sync scroll groups. If there are sync scroll groups to update, the method proceeds to step 344; otherwise, the method ends following step 342.

In step 344, the sync scroll groups data structure is updated to update the sync scroll groups based on the grid state. In one or more embodiments of the invention, the sync scroll groups data structure is updated by updating the current grid state (also referred to as current state) of the grids in a sync scroll group to reflect the grid state obtained in step 340.

In one or more embodiments, the current state of a sync scroll group may specify a set of coordinates that are associated with the sync scroll direction that is tracked in the sync scroll groups data structure for the purpose of maintaining the synchronization in the specified sync scroll direction. For example, consider a sync scroll group that is associated with a synchronization in a vertical scrolling direction. In this scenario, the current state specified in the sync scroll groups data structure for the sync scroll group may specify the vertical axis coordinates (e.g., the rows) to be currently displayed for the sync scroll group.

In this manner, the sync scroll groups data structure is updated to indicate that all grids in the sync scroll group are to be in a state that corresponds to the current state of the sync scroll group specified in the sync scroll groups data structure.

FIG. 3.4 shows a flowchart of a method of updating grid state in accordance with one or more embodiments of the invention. All or a portion of the method shown in FIG. 3.4 may be performed by, for example, a grid state manager (142, 144, FIG. 1.2) managing a grid. Other components of the system of FIGS. 1.2-2 may perform the method of FIG. 3.4 without departing from the invention.

In step 360, a policy-based time period is waited before sending a request for a grid state update. In one or more embodiments, the policy-based time period may be a period of time configured by, e.g., an administrator of the browser in which the grid state managers operate.

In step 362, a grid state request is sent for a current grid state of a grid. In one or more embodiments of the invention, the grid state request specifies obtaining a grid state to be applied to the grid managed by the grid state manager.

In one or more embodiments, the global sync group manager obtaining the grid state request performs the method of FIG. 3.5 to service the grid state request. The result of the method may include sending a grid state response to the grid state manager.

In step 364, a grid state response is obtained. The grid state response may be obtained from the global sync group manager. The grid state response may specify a grid state to be applied to the grid. For example, the grid state response may specify a set of coordinates to be displayed by the grid. Alternatively, the grid state response may indicate that no action is required by the grid state manager. For example, the grid state response may specify that the grid is not associated with any sync scroll group.

In step 366, a determination is made about whether the grid state response indicates changing grid state. In one or more embodiments, the grid state response indicates changing the grid state if both: (i) the grid state response specifies a grid state to be applied to the grid and (ii) the grid state specified in the grid state response is different from the current grid state of the grid. If the grid state response indicates changing the grid state, the method proceeds to step 368; otherwise, the method proceeds to step 360.

In step 368, the grid state is updated based on the grid state response. In one or more embodiments, the grid state is updated by applying the obtained grid state to the grid to update the displayed grid. In this manner, the grid is synchronized with the current state of the sync scroll group(s) associated with the grid.

In one or more embodiments, the update to the grid state may trigger an update to the browser display to display the grid in the updated grid state. For example, if the update to the grid state includes a new set of coordinates, the browser display may display the new set of coordinates of the grid.

FIG. 3.5 shows a flowchart of a method of providing updated grid state in accordance with one or more embodiments of the invention. All or a portion of the method shown in FIG. 3.5 may be performed by, for example, the global sync group manager (146, FIG. 1.2). Other components of the system of FIGS. 1.2-2 may perform the method of FIG. 3.1 without departing from the invention.

In step 380, a grid state request is obtained for a grid. In one or more embodiments of the invention, the grid state request obtained in step 380 is the grid state request sent by the grid state manager in step 362 of FIG. 3.4.

In step 382, the sync scroll groups data structure is searched to identify the sync scroll group associated with the grid. In one or more embodiments of the invention, the sync scroll groups data structure is analyzed to identify whether the grid is associated with any sync scroll groups. Based on the current state(s) indicated by the sync scroll groups (if any), the grid state to be applied to the grid is determined. In such scenarios in which the grid is not associated with a sync scroll group, the global sync group manager may determine that no current state is required to be provided to the grid state manager.

In step 384, the grid state response is provided to the grid state manager. In one or more embodiments of the invention, the grid state response specifies the grid state determined in step 382. Alternatively, in such scenarios in which it is determined that no current state is required to be provided to the grid state manager, the grid state response may specify that no change is required for the grid.

Example

Figure 41:
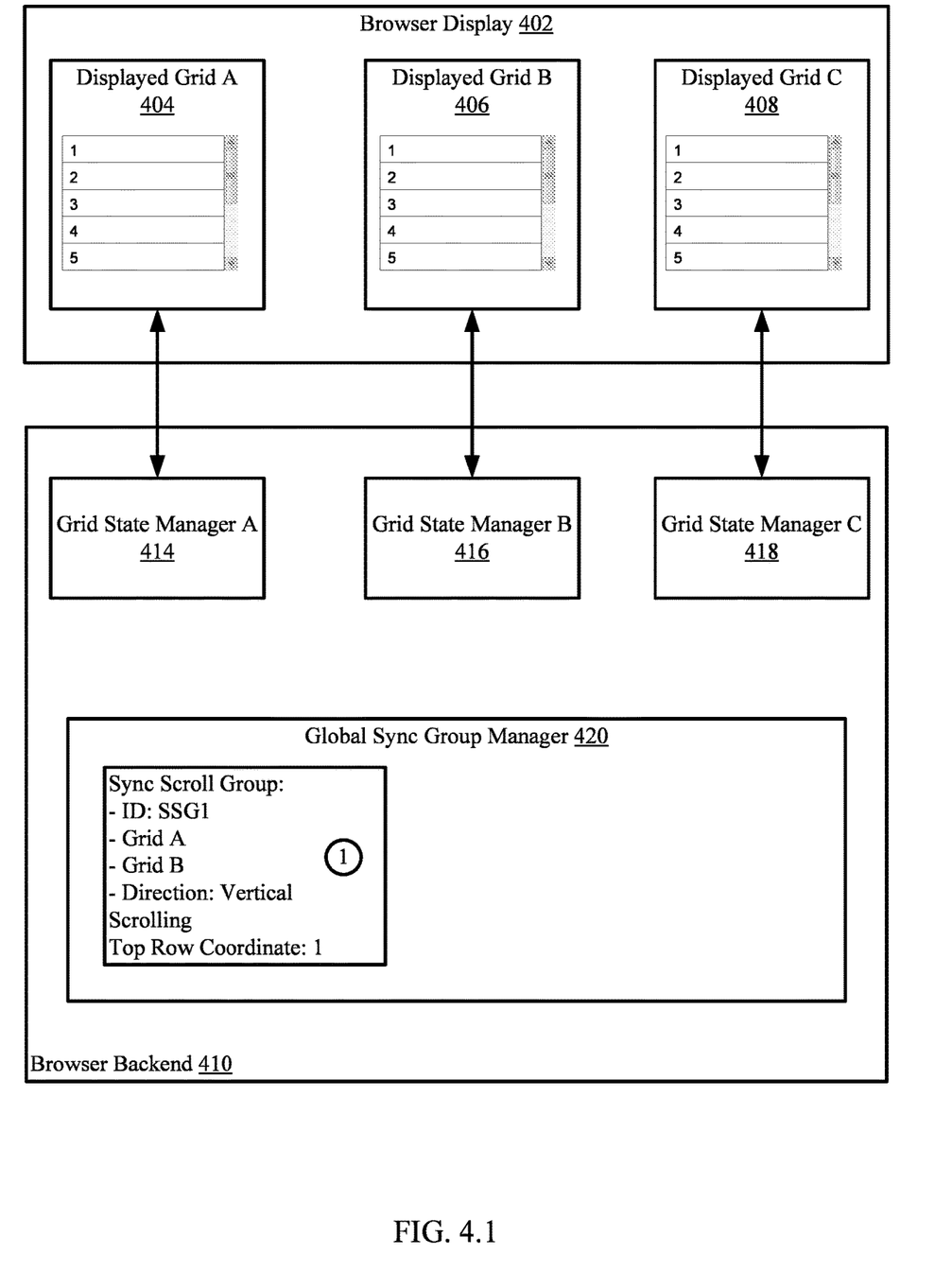
Figure 42:
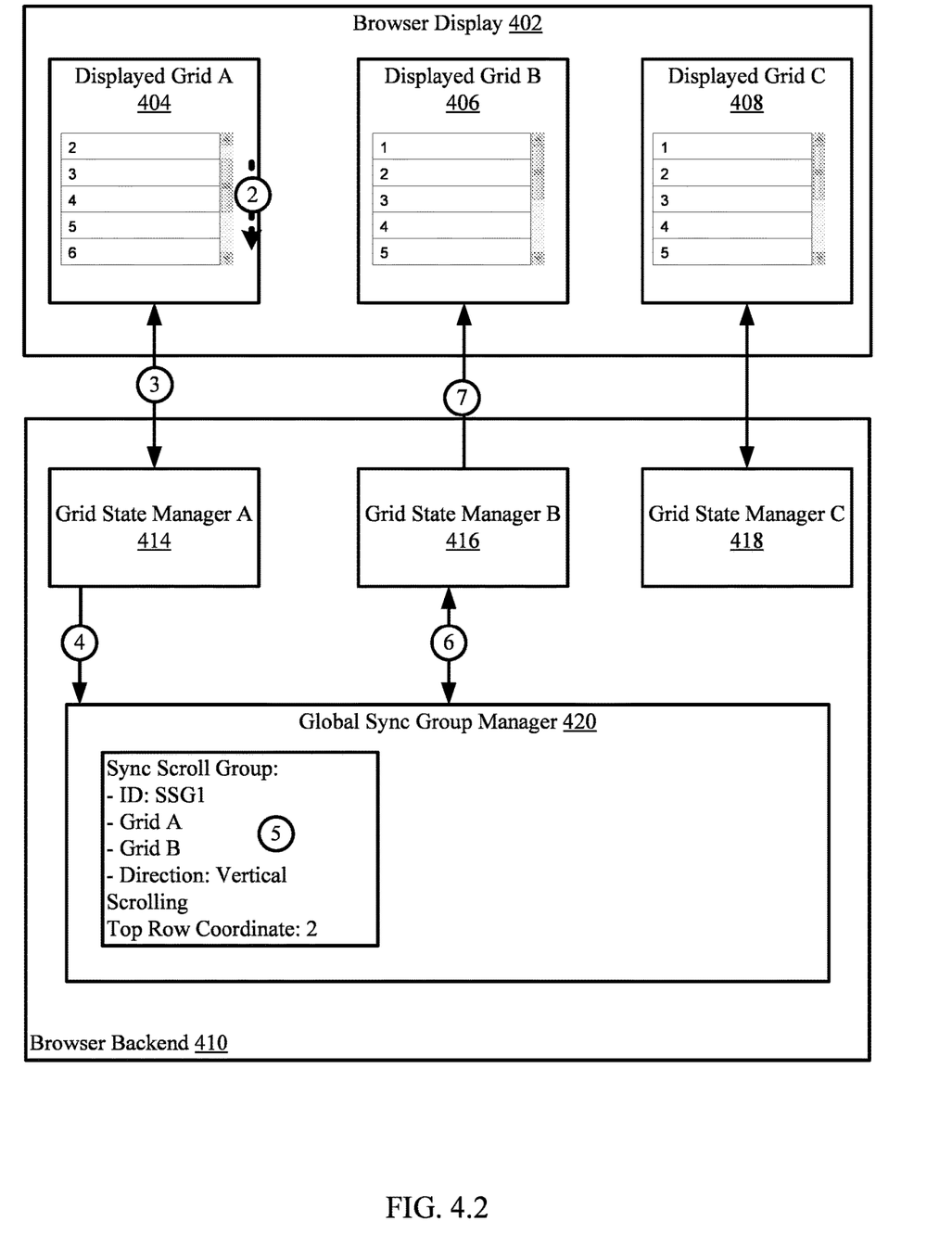
Figure 43:
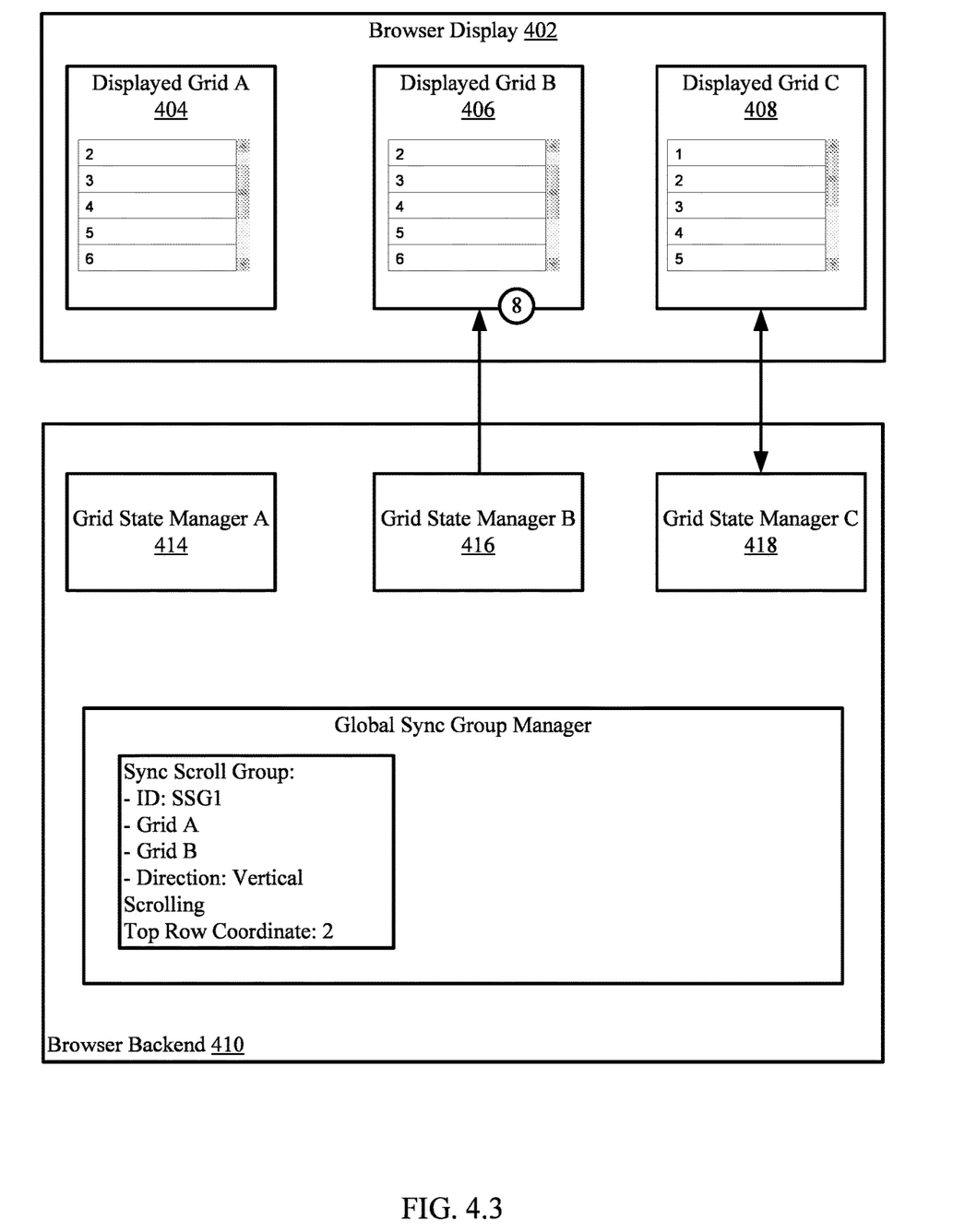

The following describes an example. FIGS. 4.1-4.3 are used to describe this example. Actions performed in this example may be illustrated in FIGS. 4.1-4.3 using circled numbers. The illustrated actions are described below using bracketed numbers (e.g., "[1]").

Turning to the example, consider a scenario in which a user operating on a client device interacts with a browser display to view and/or modify the display of three grids. FIG. 4.1 shows a diagram of an example browser. The example browser includes a browser display (402) that displays three grids (404, 406, 408). Displayed grid A (404) is associated with a first data set, displayed grid B (406) is associated with a second data set, and displayed grid C (408) is associated with a third data set. At least a portion of the first, second, and third data sets are obtained by the browser from a data system (not shown).

The browser may further include a browser backend (410) that includes three grid state managers (412, 414, 416). Grid state manager A (414) manages the grid state of displayed grid A (404). Grid state manager B (416) manages the grid state of displayed grid B (406). Grid state manager C (418) manages the grid state of displayed grid C (408). The management of the respective displayed grids (404, 406, 408) may include: (i) monitoring the grid state, (ii) periodically providing the grid state to a global sync group manager (420) of the browser backend (410), and (iii) updating the grid state based on any changes to the current state of a sync scroll group of the respective grid.

At a first point in time, a user (not shown) with a building role initiates the creation of a sync scroll group in accordance with FIG. 3.1. The global sync group manager (420) stores a sync scroll groups data structure that specifies an identifier (e.g., "SSG1") of the created sync scroll group [1]. The sync scroll group includes grid A and grid B. The sync scroll groups data structure specifies that the vertical scrolling is the direction in which grid A and grid B are synchronized. The sync scroll groups data structure further specifies the current coordinate of the grids in the sync scroll groups. At the first point in time, that current coordinate is with the top row displayed being row 1.

Turning to FIG. 4.2, at a later point in time, a second user (not shown) utilizing the browser interacts with the browser display (402) to scroll down on grid A (404) [2]. Based on the scroll, the displayed grid A (404) displays row 2 as the top row in the coordinates for the grid. This results in a change in the grid state. Grid state manager A (414) monitors the grid state of grid A (404) and detects the change in the grid state (404). Based on the detection, grid state manager A (414) provides the grid state to the global sync group manager (420) [4]. In response to receiving the grid state, the global sync group manager (420) updates the sync scroll groups data structure to indicate the new current state of the sync scroll group [5]. The update includes specifying the top row coordinate to be row 2.

At a later point in time, grid state manager B (416) communicates with the global sync group manager (420) to determine if the grid state of displayed grid B (406) is to be updated [6]. The global sync group manager (420) reads the sync scroll groups data structure to determine that grid B (406) is associated with the sync scroll group. Based on the determination, the global sync group manager (420) provides the current top row coordinate to be applied to grid B (406) to grid state manager B (416).

In response to receiving the top row coordinate, grid state manager B (416) updates the grid state of displayed grid B (406) [7]. Turning to FIG. 4.3, displayed grid B (406) now displays the grid scrolled down such that the top row is row 2 [8]. In this manner, grids A and B (404, 406) are synchronized in in their displays.

End of Example

One or more embodiments of the invention may be implemented using instructions executed by one or more processors of the data management device. Further, such instructions may correspond to computer readable instructions that are stored on one or more non-transitory computer readable mediums.

Embodiments of the invention may improve data processing technology for very large data sets. Specifically, embodiments of the invention may improve the process for managing data. Specifically, embodiments improve the user experience by providing a mechanism for synchronized scrolling for a selected group of grids. By providing such mechanisms, the user may view portions of data in multiple dimensions despite a limited display of a browser that may, for example, only provide two dimensions per grid. Such synchronization may enable a user to view large sizes of data in the multiple dimensions to manage such data (e.g., by adding data points, removing data points, modifying data points, etc.).

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a display of data on a computing device, comprising:
    obtaining, by a global sync group manager and from a first grid state manager managing a first grid, a first grid state for the first grid;
    identifying a sync scroll group associated with the first grid;
    updating a sync scroll groups data structure based on the identifying, wherein the sync scroll groups data structure specifies the first grid and a second grid, updated current coordinates, and a sync scroll direction;
    obtaining, by a second grid state manager managing the second grid, the updated current coordinates from the sync scroll groups data structure; and
    updating, by the second grid state manager and based on the updated current coordinates, a second grid state for the second grid, wherein updating the second grid state for the second grid triggers an update to a display of the second grid in a browser display on the computing device,
    wherein a third grid displayed in the browser display is not associated with the sync scroll group, and
    wherein the third grid is not modified based on the updated current coordinates.

2. The method of claim 1, wherein the sync scroll direction is one of a vertical scrolling direction and a horizontal scrolling direction.

3. The method of claim 1, wherein the first grid state comprises a set of coordinates for the first grid.

4. The method of claim 3, wherein the set of coordinates comprises a displayed top row and a displayed left-most column.

5. The method of claim 1, further comprising:
    prior to obtaining the first grid, monitoring the first grid to detect a change in the first grid state,
    wherein obtaining the first grid state is based on the monitoring.

6. The method of claim 5, wherein the change comprises scrolling the first grid in a direction specified in the sync scroll direction of the sync scroll group.

7. The method of claim 1, wherein the first grid and the second grid are displayed on a browser.

8. The method of claim 1, further comprising:
    prior to obtaining the first grid state:
        obtaining a request for generating the sync scroll group;
        generating the sync scroll group based on the request; and
        assigning the first grid and the second grid to the sync scroll group,
        wherein the request specifies the first grid, the second grid, and a sync scroll direction.

9. A system, comprising:
    a processor executing a browser,
    wherein the browser comprises: a first grid state manager, a second grid state manager, and a global sync group manager,
    wherein the global sync group manager is programmed to:
        obtain, from the first grid state manager, a first grid state for a first grid of a sync scroll group; and
        update a sync scroll groups data structure based on the first grid state,
        wherein the sync scroll groups data structure specifies the first grid and a second grid, updated current coordinates, and a sync scroll direction,
    wherein the second grid state manager is programmed to:
        send a request for a current grid state of a second grid to the global sync group manager, wherein the second grid is associated with the sync scroll group;
        obtain, from the global sync group manager, a response, wherein the response comprises the updated current coordinates; and
        based on the response, updating a second grid state of the second grid with the current grid state, and
    wherein updating the second grid state for the second grid triggers an update to a browser display of the browser, wherein the browser display comprises at least a portion of the second grid,
    wherein a third grid displayed in the browser display is not associated with the sync scroll group, and
    wherein the third grid is not modified based on the current coordinates.

10. The system of claim 9, wherein the first grid state comprises a set of coordinates for the first grid.

11. The system of claim 10, wherein the set of coordinates comprise a displayed top row and a displayed left-most column.

12. The system of claim 9, wherein the first grid state manager is further programmed to:
- monitor the first grid;
- detect, during the monitoring, a change in the first grid state; and
- based on the detecting, provide the first grid state to the global sync group manager.

13. The system of claim 12, wherein the change comprises scrolling the first grid in a direction specified in a sync scroll direction of the sync scroll group.

14. The system of claim 13, wherein the sync scroll direction is one of: a vertical scrolling direction and a horizontal scrolling direction.

15. The system of claim 9, wherein the global sync group manager is further programmed to:
- prior to obtaining the first grid state:
  - obtain a second request for generating the sync scroll group;
  - generate the sync scroll group based on the request; and
  - assign the first grid and the second grid to the sync scroll group,
  - wherein the second request specifies the first grid, the second grid, and a sync scroll direction.

16. A non-transitory computer readable medium comprising computer readable program code, which when executed by a computer processor enables the computer processor to perform a method for managing data, the method comprising:
- obtaining a first grid state for a first grid displayed on a browser, wherein the first grid state changed from a previous grid state based on scrolling of the first grid in a first scrolling direction;
- identifying, in response to the first grid state, a sync scroll group associated with the first grid, wherein the sync scroll group specifies the first grid, a second grid, a sync scroll direction, and a current grid state;
- updating the current grid state based on the first grid state; and
- updating a second grid state for the second grid based on the current grid state, wherein updating the second grid state for the second grid triggers an update to a display in a browser display on a computing device,
- wherein a third grid displayed in the browser display is not associated with the sync scroll group, and
- wherein the third grid is not modified based on the current coordinates.

17. The non-transitory computer readable medium of claim 16, the method further comprising:
- prior to obtaining the first grid state:
  - obtaining a request for generating the sync scroll group;
  - generating the sync scroll group based on the request; and
  - assigning the first grid and the second grid to the sync scroll group,
  - wherein the request specifies assigning the first grid, the second grid, and the sync scroll direction.

18. The non-transitory computer readable medium of claim 16, wherein the sync scroll direction is one of a vertical scrolling direction and a horizontal scrolling direction, and wherein the first scrolling direction is along an axis identical to the sync scrolling direction.

\* \* \* \* \*